Figure 6:
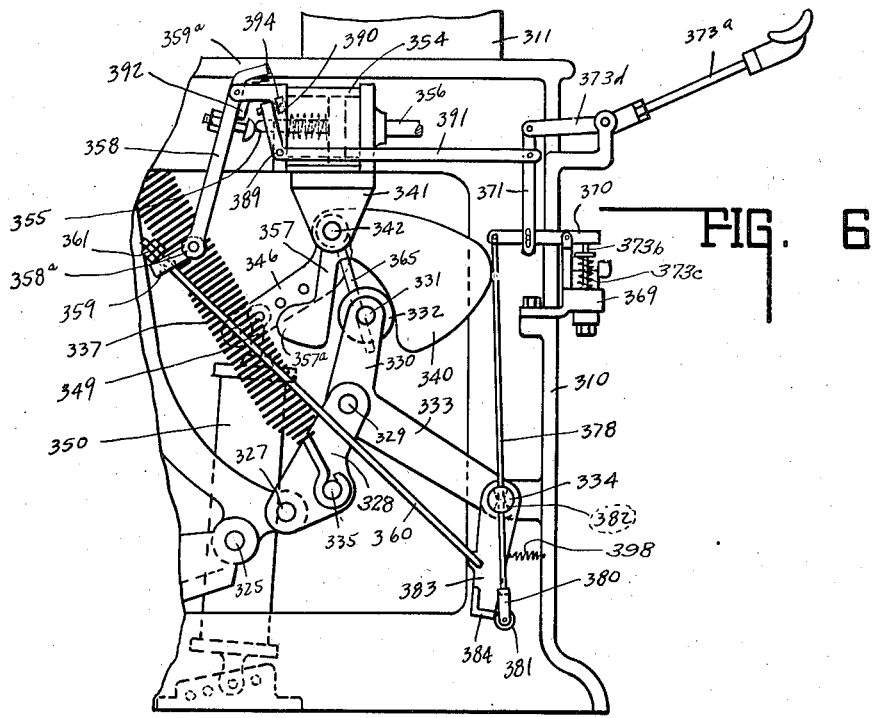

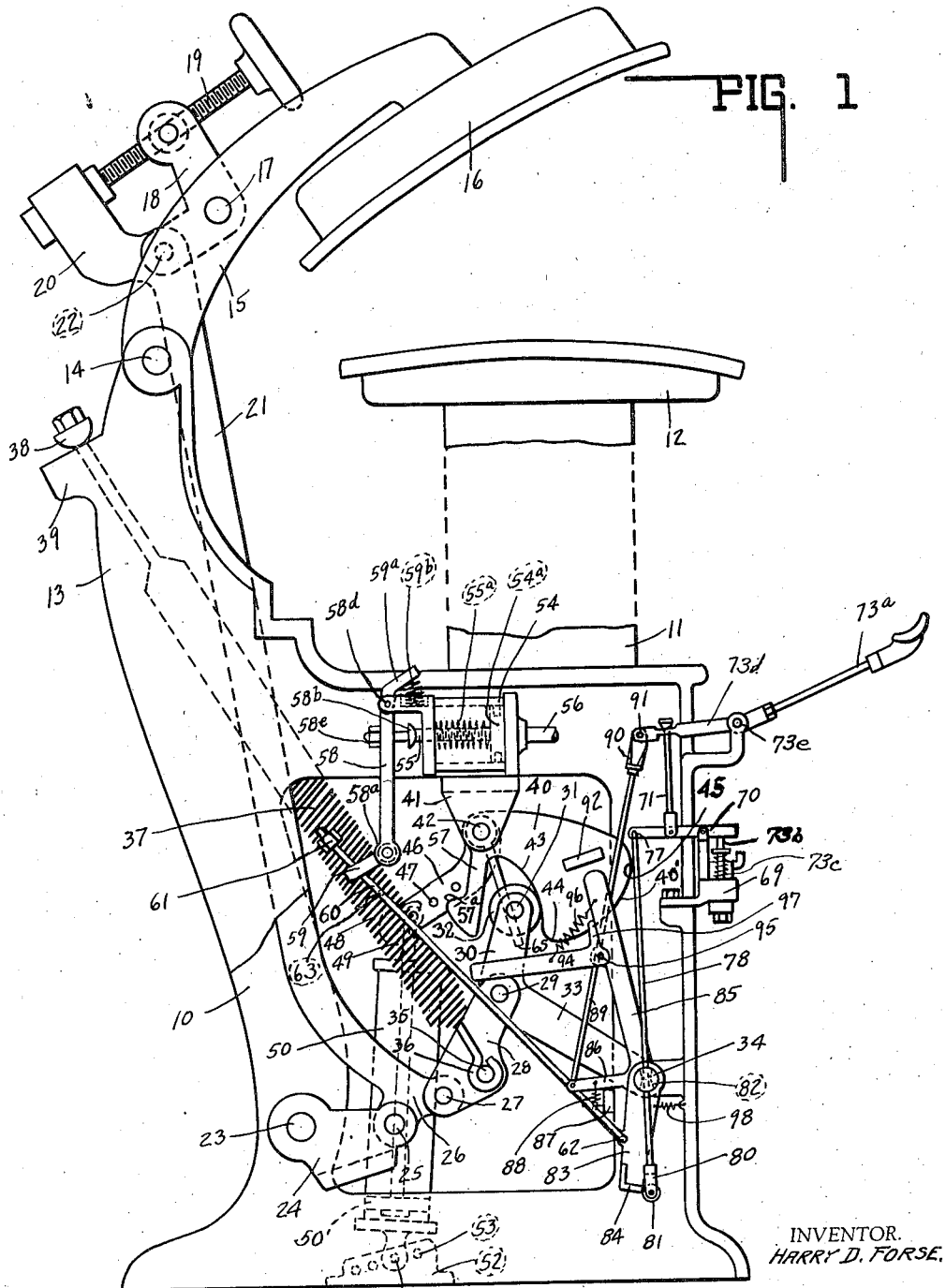

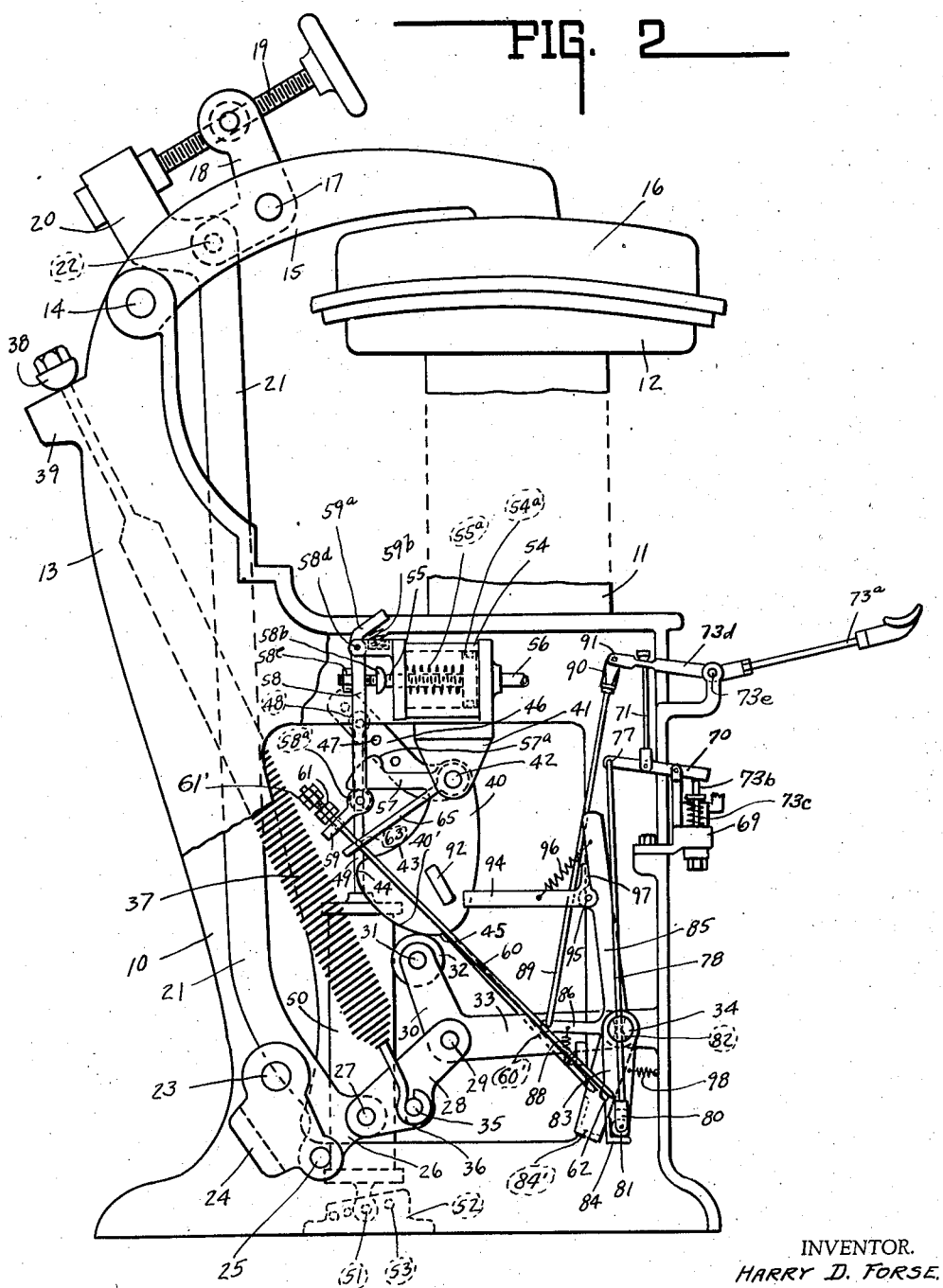

Sept. 8, 1936.  H. D. FORSE  2,053,366
PRESSING MACHINE
Filed July 21, 1932  5 Sheets-Sheet 3
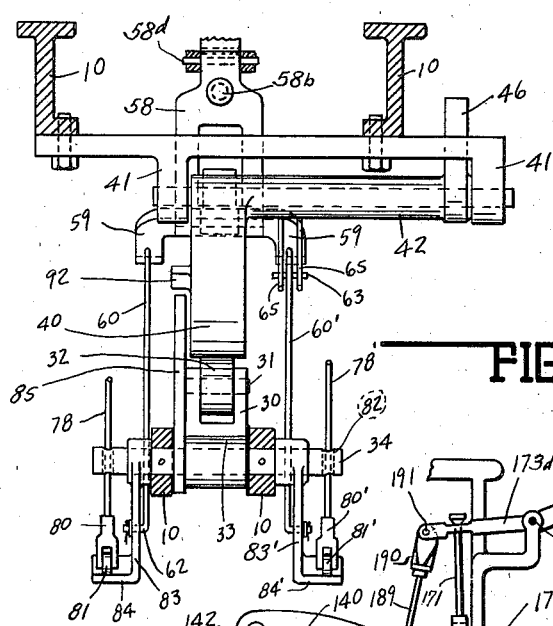
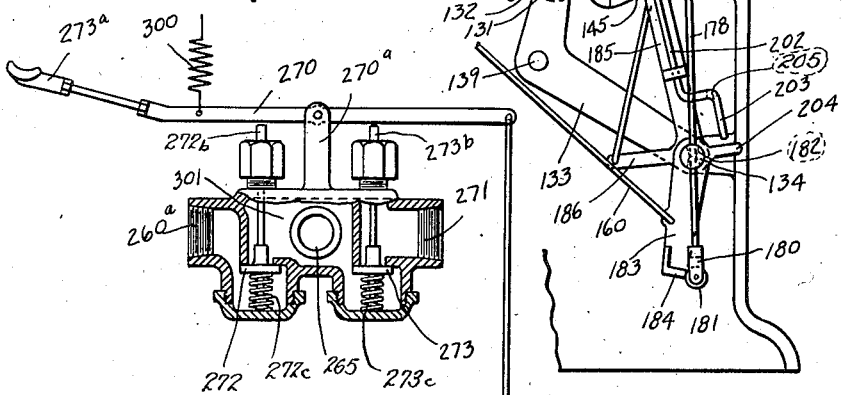
INVENTOR.
HARRY D. FORSE.
BY Lockwood Lockwood
Goldsmith & Galt
ATTORNEYS.

Sept. 8, 1936.  H. D. FORSE  2,053,366
PRESSING MACHINE
Filed July 21, 1932   5 Sheets-Sheet 4

INVENTOR.
HARRY D. FORSE.
BY Lockwood Lockwood
Goldsmith & Gatt
ATTORNEYS.

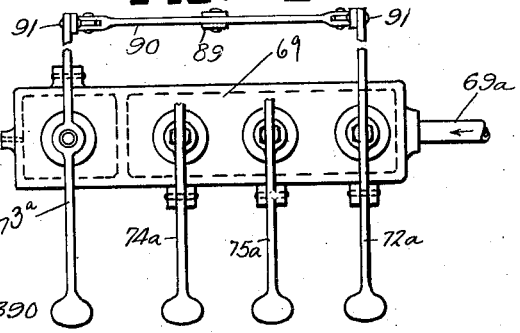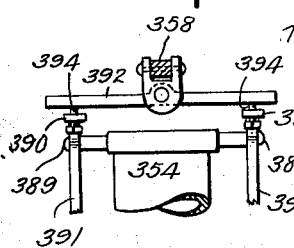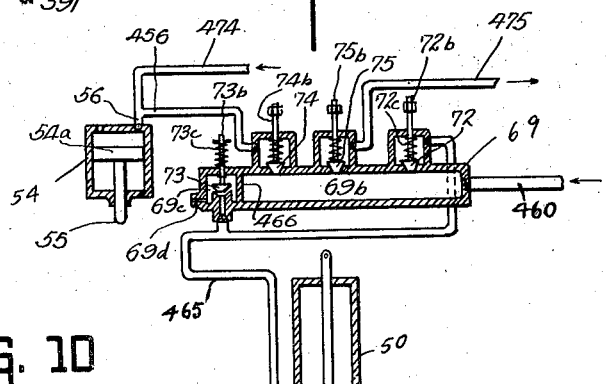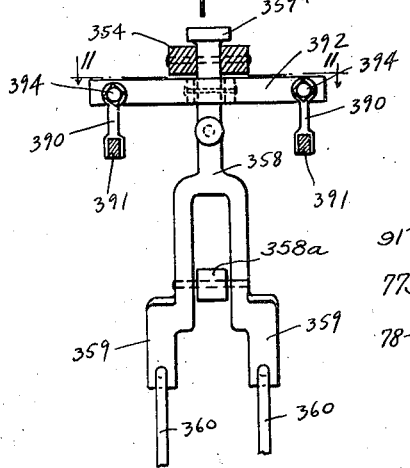

Patented Sept. 8, 1936

2,053,366

UNITED STATES PATENT OFFICE 2,053,366

PRESSING MACHINE

Harry D. Forse, Anderson, Ind.

Application July 21, 1932, Serial No. 623,784

17 Claims. (Cl. 38—41)

This invention relates to improvements in pressing machines of the type generally used in laundry and garment work.

An object of the present invention is to provide improved press closing mechanism for moving a pressing member rapidly from open position until the press is nearly closed, for moving it more slowly until the press is completely closed, and for thereafter holding the press closed.

My improved pressing machine also provides power means for closing the press, a control member for the power means and a novel arrangement for maintaining the control member in its actuated position.

Another feature of my invention is the provision of a pressing machine having fluid actuated power means for closing the same and automatic means for controlling the fluid valves when the press is closed to maintain fluid pressure in the power means.

My invention also contemplates the provision of means for releasing the pressing machine from its closed position which includes an arrangement for exhausting fluid from the power means at the same time.

My invention also provides a positive stop means preventing the press closing mechanism from operating unless the stop means is moved to inoperative position by actuation of spaced manuals by the operator. This arrangement compels the operator to keep both hands occupied and out of the danger zone when the pressing machine is closing.

My invention also provides a second stop member, in addition to that above described, which is so arranged that if the first stop member is tied in inoperative position the second stop member will prevent opening of the press.

My pressing machine is also provided with improved control mechanism by which a single manual may be used to actuate inlet and outlet valves for controlling fluid power means for operating the press. This control member is so arranged that the press may be closed with fluid pressure trapped in the power means and upon actuation of the release mechanism of the press the control member will relieve the fluid pressure in the power means.

My improved control mechanism provides control manuals for a fluid actuated power means, mechanical means for maintaining the manuals in their actuated position, and means for automatically releasing the maintaining means if the manuals are not held in operated position by the operator until the press has passed a predetermined position in its closing cycle.

Another feature of my control mechanism is the provision of a combined latch and stop member and a connection with the operating manuals of the press whereby the manuals must both be actuated together to hold the combined member in position ineffective to act as a stop member during the closing cycle of the press. Upon the release of both manuals the combined member is returned to latching position to hold the press closed.

Other novel features of my invention reside in the arrangement of the various parts necessary to provide the above described novel features, as is more fully set forth in the drawings and the accompanying specification.

Figure 7:
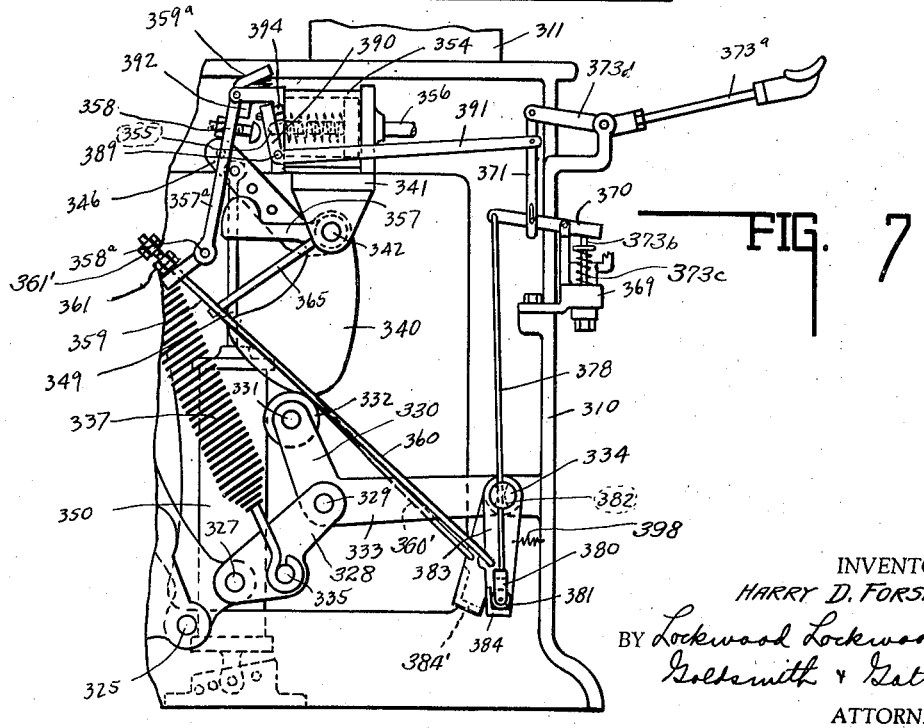

In the drawings, Fig. 1 is a side elevation of a pressing machine embodying my invention with the movable pressing element and associated parts in open position; Fig. 2 is a view similar to Fig. 1 with the press closed and before the operator has released the manual; Fig. 3 is a front elevation of certain of the operating mechanism associated with the power or head moving means; Fig. 4 is a side elevation similar to a portion of Fig. 1 and showing a modified form of the invention; Fig. 5 is a fragmental view partly in section and somewhat diagrammatic showing an arrangement of inlet and outlet valves for the power mechanism suitable for actuation by a single manual; Figs. 6 and 7 illustrate a modification and are similar to equivalent portions of Figs. 1 and 2, i. e., Fig. 6 corresponds to open position of the press and Fig. 7 corresponds to closed position before the manual is released; Fig. 8 is a top plan view of the valve structure for controlling the power means; Fig. 9 is a diagrammatic layout of the pressure fluid system; Figs. 10 and 11 are views of a portion of the latch operating mechanism of Figs. 6 and 7, Fig. 11 being a view along the line 11—11 of Fig. 10; while Fig. 12 is a perspective view of the fluid valve chamber and two of the valve operating manuals.

I have illustrated my invention as embodied in a pressing machine of a well known type having a frame 10 upon which is mounted a support 11 which carries a pressing bed 12. Upon a bracket 13 of the frame is pivotally mounted at 14 a head lever 15 which carries at its forward free end a pressing chest or head 16 adapted to coact with the bed. For movement of the head to open and close the press I provide a pull link 21 extending downwardly in the frame where it is connected with power mechanism. An adjustable connection is provided between link 21 and head lever 15 so as to adjust the position of the head with respect to the power mechanism when the press is closed. This connection comprises a bellcrank 18 pivotally mounted on the head lever at 17 and pivotally connected at 22 with the pull link. A threaded member 19 has a screw connection with the upstanding arm of bellcrank 18 so as to adjust the position of the bellcrank toward and away from the rearwardly extending projection 20 of the link 21. The lower end of pull link 21 is pivotally connected at 25 with an arm 24 which in turn is pivotally supported on the frame at 23. The lower end 26 of link 21 is moved in a clockwise direction about the point 23 to close the head upon the bed. This movement of link 21 is accomplished by a pair of toggle links 28 and 33 pivotally connected together at 29 and pivoted at one end to the pull link at 27 and at the other end to the frame at 34. The toggle links are normally biased in the broken position shown in Fig. 1, which corresponds to the open position of the press, by means of a spring 37 which has a connection at 36 with a pin 35 on toggle link 28 and an adjustable connection 38 at its upper end which engages a shoulder 39 on the frame.

For moving the toggle toward straightened position to close the press I provide a cam whose surface is so arranged that the toggle is moved very rapidly during the period when the head is moving from wide open position to fairly close proximity to the bed, then with a slower movement while the head is slowly moved into final pressure engagement with the bed, and a portion of the cam is finally engaged to lock the press closed. This arrangement is best seen in Figs. 1 and 2 and comprises a cam 40 which is rigidly mounted on a shaft 42 which in turn is supported by brackets 41 on the frame. The cam portion 43 provides the first rapid movement of the pressing members from wide open to nearly closed position, the portion from 44 to 40' provides the slow final closing movement of the pressing members and the portion 45 holds the pressing members locked in their fully closed position during a pressing operation. The cam surfaces engage a follower 32 which is rotatably mounted at 31 on an upstanding arm 30 which is rigid with toggle link 33.

Power mechanism is provided for rotating the cam so as to produce the press closing operation. The power device illustrated comprises a motor 50 having a piston 50' whose piston rod 49 is pivotally connected at 48 to an arm 46 which is integral with cam 40 or rigid with shaft 42 as desired, so long as arm 46 and cam 40 move in unison. A plurality of openings 47 is provided in arm 46 for adjustability. The motor 50 is pivotally mounted at 51 in a base member 52 which may also have a plurality of adjustments as provided at 53.

Means is provided for locking the cam 40 in its position corresponding to a closed press. This means comprises an arm 57 rigid with cam 40 which has at its free end a camming surface 57a adapted to cam outwardly a roller 58a on a latch 58 as arm 57 moves in a clockwise direction during closing of the press. When the press is closed roller 58a comes to rest beneath arm 57 and holds cam 40 in the locked position of Fig. 2. The latch 58 is pivotally mounted at 58d upon a suitable fixed bracket and has a projection 59a at its upper end which is engaged by a suitable compression spring 59b which biases the latch toward the locking position of Fig. 2. At the lower end of the latch are projections 59 for a purpose later described.

Power means is provided for moving the latch 58 to unlock cam 40 when is is desired to open the press. This means comprises a motor 54 having a piston 54a whose piston rod 55 abuts a contact member 58b adjustably mounted at 58e on the latch 58. A spring 55a biases piston 54a toward its forward position shown in Fig. 2. It will be obvious therefore that a stroke of piston 54a rearwardly or to the left as seen in Figs. 1 and 2 will rotate latch 58 in a clockwise direction so as to move roller 58a from beneath arm 57.

The control of motive fluid for actuating motor 50 is illustrated in Figs. 1, 2, 3, 8, 9 and 12. In a suitable position on the frame is mounted a valve chest 69 which is supplied with motive fluid through conduit 69a. In this valve chest are mounted a normally closed inlet valve 72 and a normally open exhaust valve 73 for controlling motor 50, a press release valve 74 and a tandem valve 75 for a release operation at another press. These valves are operated respectively by manuals 72a, 73a, 74a, and 75a. The valves are provided with suitable stems which are indicated by the suffix b and the valves are biased to their normal positions by springs indicated by the suffix c. Chest 69 is divided by the partition wall 466 so as to provide a supply chamber 69b and an exhaust chamber 69c which communicates with the atmosphere through a vent 69d. A combined flow and exhaust conduit 465 provides communication between motor 50 and chambers 69b and 69c. Valves 72, 74 and 75 are similarly actuated and only the mechanism connected with valve 72 is fully illustrated. This comprises a link 70' adapted to engage beneath an enlarged head on the valve stem 72b, this link 70' being connected by a link 71' with an arm 72d rigid with manual 72a and extending on the opposite side of the fulcrum 72e so that pressure downward upon manual 72a raises links 71' and 70' thereby lifting valve 72 from its seat against the bias of spring 72c. Exhaust valve 73 has a slightly different leverage as best seen in Fig. 12 which shows manual 73a pivotally mounted at 73e and having a rearwardly extending portion 73d connected by link 71 with link 70. The fulcrum of link 70 is arranged so that depression of manual 73a depresses stem 73b and moves valve 73 against its seat. Simultaneous actuation of manuals 72a and 73a is thus necessary to effectively supply motive fluid to motor 50.

Mechanical means is provided for maintaining one or both of the valves 72 and 73 in their actuated position when the press is finally closed. To this end links 78 and 78' are pivotally connected at 77 and 77' respectively with the actuating mechanism for valves 73 and 72 respectively as best seen in Figs. 1, 2 and 12. These links extend downwardly through guiding slots 82 in pivots 34. Maintenance of links 78 and 78' in their raised position will maintain valve 72 open and valve 73 closed. For so maintaining links 78 and 78', each is provided at its lower end with a yoke 80, 80' and a follower 81, 81' which is adapted to be engaged by a seat 84, 84' on an arm 83, 83' which is pivotally mounted upon the frame and preferably upon the pivot 34. Springs 98 bias arms 83, 83' toward the position to engage seats 84, 84' beneath followers 81, 81'. The position of arms 83, 83' is controlled by rods 60, 60' which pass through the projections 59 on the lower end of latch 58 and each rod is provided at its free end with an adjustable nut 61, 61'. As the latch 58 is normally biased toward the position shown in Fig. 2, rods 60, 60' will normally be ineffective to hold arms 83, 83' in their withdrawn position and therefore upon actuation of valves 72 and 73 and the raising of links 78 and 78', seats 84, 84' will be effective to engage beneath the links 78, 78' and hold them in that position.

I prefer to close the inlet valve 72 when the press is finally closed so as to trap the air in motor 50. To this end I provide an arm 65 rigid with shaft 42 which is adapted to engage a pin 63 on rod 60' as the press is finally closed which would thus pull upon rod 60' and rotate arm 83' in a clockwise direction so as to move seat 84' from beneath link 78' and permit valve 72 to be closed by its spring. The parts would then be in the position of Fig. 2 with the press locked closed, valve 72 closed, and valve 73 held closed by seat 84 after the operator releases manual 73a. I provide the following mechanism as an additional safeguard to compel safe operation of the press. On pivot 34 is mounted a bellcrank having an upstanding arm 85 and a laterally extending arm 86. A spring 88 biases the bellcrank against an abutment 87 on the frame. In its normal position the upper end of arm 85 lies beneath an abutment 92 on cam 40 when the press is open as shown in Fig. 1. To move arm 85 out of the blocking position of Fig. 1 a link 89 connected to the extremity of arm 86 extends upwardly to a single-tree 90 (see Fig. 12) and this is connected at 91 with the portions 72d and 73d of manuals 72a and 73a. This arrangement compels the actuation of both manuals as neither of them alone will provide sufficient movement of link 89 to move the bellcrank arm 85 out of the blocking position of Fig. 1 to the position shown in Fig. 2.

To prevent the fastening of arm 85 of the above-described bellcrank in a position where it would be ineffective against abutment 92, I provide an arm 94 pivotally mounted on the arm 85 at 95 and biased in a clockwise direction by a spring 96. This movement is limited by the engagement of shoulder 97 against arm 85. It results from this arrangement that if arm 85 be held in its forwardmost position as shown in Fig. 2, (as by tying it there) arm 94 is in blocking position against abutment 92 when the press is closed, as shown in Fig. 2, and this will prevent opening of the press. It is therefore necessary as above described to depress both manuals 72a and 73a when the press is closed to pull upon link 89 and hold arm 85 in the position of Fig. 2; but after the press is closed the release of one or both manuals, because of single-tree 90, will permit arm 85 to return toward the position of Fig. 1 and the arm 94 will be out of the way of abutment 92 when the press again opens.

To release the press from the closed position of Fig. 2 manual 74a is depressed which opens valve 74 and admits fluid from the chamber 69b through conduits 456 and 56 to motor 54 which causes the rearward stroke of piston 54a and the clockwise rotation of latch 58 already described. Spring 37 will then return the parts to the open position shown in Fig. 1. The rearward movement of a part 59 of latch 58 is sufficient to engage nut 61 and to withdraw seat 84 from beneath link 78 so as to open exhaust valve 73 simultaneously with release of the latch. The other part 59 will also engage nut 61' and withdraw seat 84' from beneath link 78' and close valve 72 if this has not already been accomplished by arm 65.

In Fig. 4, I have illustrated a modification of a part of the operating mechanism of Fig. 1 and similar parts of the mechanism have been given numerals of the one hundred series corresponding to the numerals of Fig. 1. Parts not otherwise described are as described in connection with Figs. 1 and 2. The modification comprises the association with the abutment 192 on cam 140 of means for positively removing the maintaining seats 184 from beneath rods 178 if the manuals 172a and 173a are not maintained in actuated position until the cam 140 has moved sufficiently on the closing cycle of the press to enable abutment 192 to pass the automatic stop arrangement shown. To this end I have provided a contact member 200 on a rod 202 which is slidably mounted upon the arm 185 and the contact member is biased in extended position by a spring 201. The lower end of rod 202 is provided with portions 203 which are adapted to engage arms 204 rigid with the members 183 of which there are two as described in connection with Figs. 1 and 2. For this purpose the rod 202 may have a lateral extension or bifurcated end as indicated at 205 so as to provide two operating members, one on each side of the machine. It will be understood that arm 186 is rigid with arm 185 and connected by rod 189 to a single-tree arrangement similar to that shown in Fig. 12 so that actuation of manuals 172a and 173a together is necessary to move arm 185 clockwise about pivot 134 which will remove contact member 200 from the path of abutment 192 as cam 140 moves on its press closing cycle. If the operator release one or both of these manuals before abutment 192 has passed member 200 the seat 184 will hold the manual in actuated position and cam 140 will continue to move until abutment 192 has contacted member 200 and depressed rod 202 so that portions 203 engage the arms or lugs 204 which will move the arms 183 in clockwise direction and release the links 178 so that the valves in chamber 169 will be returned to their normal positions by their actuating springs and the press will open, as the other press parts will function as those of Figs. 1 and 2.

Fig. 5 shows the arrangement of a combined inlet and exhaust valve for motor 50 which may be operated by a single manual if desired. So far as possible parts similar or analogous to those of Figs. 1 and 2 are given similar numerals of the two hundred series. This valve casing has a fluid inlet 260a, a fluid outlet 271 and an intermediate chamber 301 from which branches conduit 265 which is a combined flow and exhaust conduit leading to motor 50. In the casing is a normally closed inlet valve 272 and an outlet valve 273 biased toward closed position by spring 273c. The valve springs are designated by the suffix c, and their actuating stems by the suffix b. On a bracket 270a is mounted an arm 270 for actuation by a manual 273a. A spring 300, which is more powerful than spring 273c, biases the arm 270 in a clockwise direction and holds valve 273 normally open. The rest of the press structure is similar to that described in Figs. 1 and 2, the only modification being the arrangement of seat 284 on arm 283 which is provided with an additional stop 284a. When the press is open seat 284a is entirely removed from beneath link 278 and valve 272 is closed and valve 273 is open. Upon depression of manual 273a, either alone or in combination with a second manual connected with the single-tree arrangement and a link corresponding to 89 connected with a stop member 85, as previously described, fluid flows through conduit 265 to operate a motor 250 (not shown). This causes the press to close and during the final closing movement an arm corresponding to arm 65 of Figs. 1 and 2 will move the rod 260 sufficiently to move arm 283 to the position shown in Fig. 5 at which time link 278 drops from seat 284 to seat 284a. This corresponds to closed position of both valves as shown in Fig. 5 and traps the fluid pressure in the operating motor. Upon actuating the press release mechanism of motor 54 the latch 58 will move the link 260 beyond the position of Fig. 5 so as to rotate arm 283 in a counterclockwise direction, thus removing seat 284a from beneath link 278, whereupon spring 300 will move arm 270 clockwise and open outlet valve 273 for the exhaust of the press operating motor.

Figs. 6 and 7 are similar to Figs. 1 and 2 and show a modification of the press control mechanism. Parts similar to those in Figs. 1 and 2 have been given like numerals of the three hundred series. Here latch 358 and arm 357 on cam 340 are so arranged that latch 358 when standing in its normal position vertically as seen in Fig. 7, places roller 358a directly in the path of movement of the somewhat flattened portion 357a of arm 357. With the latch in this position it acts also as a stop member for cam 340 and prevents the complete closing of the press. To hold latch 358 in the rearward position of Fig. 6 so it is ineffective to act as a stop member, I provide mechanism which requires the use of both hands of the operator. This is more clearly shown in Figs. 10 and 11 and comprises a single-tree arrangement 392 connected to latch 358 and operable by two bellcranks 391 pivoted at 389 on opposite sides of the motor 354. Each bellcrank has an arm 390 which carries an adjustable contact member 394 and these contact members engage opposite ends of the single-tree 392. The longer arms of the bellcranks 391 are secured to the links 371 which are connected one with the manual 372a and the other with manual 373a. These manuals are similar to those previously described, 372a actuating the inlet valve for motor 350 and 373a actuating the outlet valve for that motor. The arrangement of the single-tree 392 is such that both manuals must be depressed to move latch 358 to the position where it is ineffective as a combined stop and latch member.

The operation of this modified form of control mechanism is as follows: To close the press the operator depresses manuals 372a and 373a which moves latch 358 rearwardly where it is ineffective either as a latch or a stop member. The latch is then in the position of Fig. 7 and it will be noted part 359 does not move rearward sufficiently to engage nut 361 to pull rod 360 rearward. Therefore seat 384 remains beneath link 378. Motor 350 actuates cam 340 to close the press. The operator then releases manuals 372a and 373a whereupon the inlet valve closes if arm 365 has engaged a pin similar to 63 on rod 360' so as to move seat 384' to the position shown in Fig. 7. However, seat 384 remains beneath link 378 and holds the exhaust valve in its operated or closed position when the operator releases manual 373a and the parts are in the position of Fig. 7. Upon the release of the manuals latch 358 is returned beneath arm 357 by its biasing spring and the press is locked closed. This return movement of latch 358 is made possible by the lost motion connection between links 371 and 370. Fluid is thus trapped in motor 350 while the press is closed. The press is opened by release motor 354 in a manner similar to that described in connection with Figs. 1 and 2, that is to say, the motor piston makes a stroke rearwardly which moves latch 358 to the position shown in Fig. 6 which permits spring 337 to open the press. The movement of latch 358 clockwise to the position of Fig. 6 removes seat 384 from beneath link 378' so that the exhaust valve for motor 350 opens simultaneously with the release of latch 358.

The invention claimed is:—

1. The combination with a pair of pressing elements, one of which is movably supported for movement toward the other for pressing purposes, of a fluid pressure operable mechanism for causing such pressing movement, means for controlling the application of pressure, stop means arranged to prevent pressing movement and coordinated with the control means for positioning the stop means in inoperative position when predetermined positioning of the control means is effected, and a second stop means operatively associated with the first mentioned stop means for preventing return movement of the movable press element upon deliberate movement of the first mentioned stop means into an inoperative position to defeat the protection of the first mentioned stop means.

2. The combination with a pair of pressing elements one of which is movably supported for movement toward the other for pressing purposes, of a fluid pressure operable power means for causing such pressing movement, means for returning the movable member to non-pressing position, a pressure fluid supply valve and a pressure fluid discharge valve for said power means, means operable in the movement of the movable member into final pressing position to automatically shut the supply valve, means for releasing the movable element to the returning means, and other means operable in the initial movement of the releasing means to open the discharge valve.

3. A device as defined by claim 2, characterized by the addition of means operable in the initial movement of the releasing means for actuating the supply valve to close the same when the first mentioned supply valve closing means fails to function.

4. The combination with a pair of pressing elements one of which is movably supported for movement toward the other for pressing purposes, of a fluid pressure operable means for causing such pressing movement, a dual valve for supplying pressure to, holding pressure in and exhausting pressure from said fluid pressure operable means, a manually operable single means for effecting dual valve operation, and means operatively associated with the single means for automatically stopping fluid pressure supply to the pressure operable means upon the movable member attaining pressing position, means for initiating the opening of the press and means for automatically exhausting the pressure from the pressure operable means for release of the movable member upon the operation of said press opening initiating mechanism.

5. In a pressing machine, a frame, a pressing bed thereon, a head lever pivotally mounted on the frame, a pressing head carried by said lever for movement into and out of engagement with said bed to close and open the press, an oscillating link pivoted on the frame, a pull link connected between the head lever and said oscillating link, a toggle for moving said oscillating link and the pull link connected therewith in press-closing direction as said toggle is straightened, and cam means for straightening said toggle.

6. In a pressing machine, a pair of coacting relatively movable pressing members, power means and mechanism connected therewith for relatively moving said members to close the press, means for opening the press when said power means is released, supply means for said power means including control members operable by spaced manuals requiring actuation by two hands of an operator for effective supply of power to said power means, mechanical latching means for holding said control members in actuated position independently of said manuals, stop means normally in operative position for engaging a part of said press-closing mechanism to prevent press closure, and an operative connection between said stop means and said spaced manuals requiring actuation of both manuals to move said stop means to inoperative position.

7. In a pressing machine, a pair of coacting relatively movable pressing members, power means and mechanism connected therewith for relatively moving said members to close the press, stop means normally in operative position for engaging a part of said mechanism to prevent press closure, and two spaced manuals having a single-tree connection with said stop means requiring actuation of both manuals to move said stop means to inoperative position.

8. In a pressing machine, a pair of coacting relatively movable pressing members, a cylinder and piston motor for relatively moving said members to close the press, fluid supply means for said motor including a normally closed inlet valve and a normally open outlet valve, means for actuating said valve to supply fluid to the cylinder of said motor, means for holding said valves in actuated position, and means actuated by final closing movement of said motor for releasing said inlet valve holding means to cut off fluid supply to said motor.

9. In a pressing machine, a pair of coacting relatively movable pressing members, a cylinder and piston motor for relatively moving said members to close the press, fluid supply means for said motor including a normally closed inlet valve and a normally open outlet valve, means for actuating said valves to supply fluid to the cylinder of said motor, means for holding said valves in actuated position, means for latching the press closed, means for releasing said latch means, and means operable upon release of said latching means to release said holding means.

10. In a pressing machine, a pair of coacting relatively movable pressing members, power means and connecting mechanism for moving one of said pressing members to close the press, means tending to open the press when said power means is deenergized, a control member for said power means biased toward press-opening-producing position, maintaining means for holding said control member in press-closing-producing position after manual movement to that position, release means for said maintaining means and normally operable by a part of said press closing mechanism to move said maintaining means to inoperative position, and an operative connection between said release means and said control member for holding said release means in inoperative position by actuation of said control member in press-closing-producing direction.

11. In a pressing machine, a pair of coacting relatively movable pressing members, power means and connecting mechanism for moving one of said pressing members to close the press, means tending to open the press when said power means is deenergized, a control member for said power means biased toward press-opening-producing position, maintaining means for holding said control member in press-closing-producing position after manual movement to that position, release means for said maintaining means and normally operable by a part of said press closing mechanism to move said maintaining means to inoperative position, two spaced safety manuals each requiring a hand of the operator for its actuation, and an operative connection between said manuals and release means requiring operation of both manuals for holding said release means in inoperative position.

12. In a pressing machine, a pair of coacting relatively movable pressing members, power means and connecting mechanism for moving one of said pressing members to close the press, means tending to open the press when said power means is deenergized, supply means for said power means including control members operable by two spaced safety manuals requiring two hands of an operator for their actuation, means biasing said control members to press-opening-producing position, maintaining means for holding said control members in press-closing-producing position after manual movement to that position, release means for said maintaining means and normally operable by a part of said press closing mechanism to move said maintaining means to inoperative position, and an operative connection between said manuals and release means requiring operation of both manuals for holding said release means in inoperative position.

13. A pressing machine as in claim 12, and including a stop means normally in operative position for engagement by a part of said press closing mechanism for preventing closure of said press, and in which said operative connection with said manuals is arranged to move said stop means to inoperative position.

14. In a pressing machine, a pair of coacting relatively movable pressing members, power means for relatively moving said members to close the press, means tending to open the press upon deenergization of said power means, a combined latch and stop member arranged when in operative position to prevent closure of the press and after the press is closed operable to latch the press closed independently of said power means, and means for holding said combined member in inoperative position during press closure and for returning said combined member to effective latching position after press closure.

15. In a pressing machine, a pair of coacting relatively movable pressing members, power means for relatively moving said members to close the press, means tending to open the press upon deenergization of said power means, a combined latch and stop member arranged when in operative position to prevent closure of the press and after the press is closed operable to latch the press closed independently of said power means, and control means for said power means including means for holding said combined member in inoperative position during press closure and for returning said combined member to effective latching position after press closure.

16. In a pressing machine, a pair of coacting relatively movable pressing members, power means for relatively moving said members to close the press, means tending to open the press upon deenergization of said power means, a combined latch and stop member arranged when in operative position to prevent closure of the press and after the press is closed operable to latch the press closed independently of said power means, and supply means for said power means including control members operable by two spaced safety manuals requiring the two hands of an operator for their actuation, and an operative connection between said manuals and said combined member requiring actuation of both of said manuals in press-closing-producing direction to hold said combined member in inoperative position.

17. In a pressing machine, a pair of coacting relatively movable pressing members, means for causing relative ironing engagement of said members, said means including a toggle and a cam coacting therewith to move said toggle by a continuous action toward straightened position to close the press, said cam having a portion for causing rapid movement of said toggle while relatively moving said members from open to nearly closed position, said cam having a portion for causing slow movement of said toggle from said nearly closed position into final closed position, and there being a smooth curve connecting said cam portions to insure continuous action.

HARRY D. FORSE.